US009792433B2

United States Patent
Yang et al.

(10) Patent No.: US 9,792,433 B2
(45) Date of Patent: Oct. 17, 2017

(54) METHOD AND DEVICE FOR DETECTING MALICIOUS CODE IN AN INTELLIGENT TERMINAL

(71) Applicants: Beijing Qihoo Technology Company Limited, Beijing (CN); Qizhi Software (Beijing) Company Limited, Beijing (CN)

(72) Inventors: Kang Yang, Beijing (CN); Zhuo Chen, Beijing (CN); Hai Tang, Beijing (CN)

(73) Assignee: BEIJING QIHOO TECHNOLOGY COMPANY LIMITED, Beijing (CN)

( * ) Notice: Subject to any disclaimer, the term of this patent is extended or adjusted under 35 U.S.C. 154(b) by 0 days.

(21) Appl. No.: 15/108,927

(22) PCT Filed: Oct. 31, 2014

(86) PCT No.: PCT/CN2014/090032
§ 371 (c)(1),
(2) Date: Jun. 29, 2016

(87) PCT Pub. No.: WO2015/101096
PCT Pub. Date: Jul. 9, 2015

(65) Prior Publication Data
US 2016/0321453 A1 Nov. 3, 2016

(30) Foreign Application Priority Data

Dec. 30, 2013 (CN) .......................... 2013 1 0746029
Dec. 30, 2013 (CN) .......................... 2013 1 0746115

(51) Int. Cl.
G06F 21/56 (2013.01)
G06F 21/55 (2013.01)
G06F 21/60 (2013.01)

(52) U.S. Cl.
CPC ............ *G06F 21/55* (2013.01); *G06F 21/562* (2013.01); *G06F 21/566* (2013.01); *G06F 21/602* (2013.01); *G06F 2221/034* (2013.01)

(58) Field of Classification Search
CPC .................. G06F 21/56; G06F 21/562–21/564
See application file for complete search history.

(56) References Cited

U.S. PATENT DOCUMENTS 8,001,595 B1 * 8/2011 Spurlock ............... G06F 21/563
713/188
8,321,942 B1 * 11/2012 Chiueh ................. G06F 21/564
726/22

(Continued)

FOREIGN PATENT DOCUMENTS

CN 101359351 A 2/2009
CN 102760219 A 10/2012

(Continued)

OTHER PUBLICATIONS

Enck et al., A Study of Android Application Security, 2011.*

(Continued)

*Primary Examiner* — Minh Dinh
(74) *Attorney, Agent, or Firm* — Harness, Dickey & Pierce, P.L.C.

(57) ABSTRACT

The present invention discloses a method and device for detecting malicious code in an intelligent terminal. The method comprises: acquiring a virtual machine executable file of an application from an application layer of an intelligent terminal operating system; decompiling the virtual machine executable file to obtain a decompiled function information structure; parsing the decompiled function information structure to extract a function calling sequence in the decompiled function information structure; matching the function calling sequence using a preset malicious code feature library; if matching succeeds, determining that the virtual machine executable file of the application contains malicious code. By applying the solution of the present invention, through a virtual machine executable file of the application, it may be analyzed and determined whether the application comprises malicious code, such that a tampered application program or a malicious software may be (Continued)

detected and removed, thereby protecting security of the intelligent terminal.

9 Claims, 7 Drawing Sheets

(56) References Cited

U.S. PATENT DOCUMENTS

2005/0223238 A1\* 10/2005 Schmid ................ G06F 21/563
                                                                                         713/188
2010/0235913 A1\* 9/2010 Craioveanu ........... G06F 21/563
                                                                                         726/23

FOREIGN PATENT DOCUMENTS

| CN | 102789562 A | 11/2012 |
| --- | --- | --- |
| CN | 102799826 A | 11/2012 |
| CN | 102819697 A | 12/2012 |
| CN | 103268445 | 8/2013 |
| CN | 103365699 | 10/2013 |
| CN | 103440459 | 12/2013 |

OTHER PUBLICATIONS

Ge et al., Malicious Code Detection for Android Using Instruction Signatures, IEEE, Jun. 2014.\*

Hoffman et al, Slicing Droids: Program Slicing for Smali Code, ACM, 2013.\*

\* cited by examiner

| | | |
|---|---|---|
| registers_size | ushort | Number registers used in the segment of code |
| ins_size | ushort | Words of input parameters of the method in the segment of codes |
| outs_size | ushort | Space that needs to be provided for calling the segment of codes to an output function of the function |
| tries_size | ushort | Number of try_item of the object; if not 0, it will appear as a tries arry after the present object insns |
| debug_info_off | uint | Offset amount from the beginning of the file to the debug info; without information, the value is 0; if not 0, it represents a position of a data segment; the data shall follow a debug_info_item prescribed format |
| insns_size | uint | Length of the Instructions list, with two bytes as a unit |
| insns | Ushort [insns_size] | Bytecode array. The format of the bytecode will be detailed in the file "Bytecode for the Dalvik VM." Although it is defined as a ushort-type array, some internal structures employ a 4-byte alignment; if the file is just a file subjected to a byte exchange operation, the byte exchange can only be performed within the ushort type. |
| padding | ushort (optional) = 0 | Two padding bytes are used to satisfy the tries 4-byte alignment manner. The element only exists when the tries_size is an odd number and not 0. |
| tries | try_item [tries_size] (optional) | This array is for identifying where abnormalities are possibly thrown out in the representations. The array elements shall be arranged in an ascending order of the addresses, and no repetitive addresses shall appear. This element only exists when the tries_size is not 0. |
| handlers | encoded_catch_handler_list (optional) | These bytes represent a series of abnormal types and an address list of their processing method; each try_item has an offset of one byte width; and the element only exists when the tries_size is not 0. |

Fig. 7

```
offset    machine code                    mnemonic symbol and instruction sequence
000000:   1203                            0000: const/4 v3, #int 0 // #0
000002:   54f4 5609                       0001: iget-object v4, v7, Lcom/biznessapps/activities/CommonFragm
000006:   38d4 3a00                       0003: if-eqz v4, 003d // +003a
00000a:   7100 020f 0000                  0005: invoke-static {}, Lcom/biznessapps/api/AppCore;.getInstance
000010:   0cd4                            0008: move-result-object v4
000012:   6ee0 fc0e 0400                  0009: invoke-virtual {v4}, Lcom/biznessapps/api/AppCore;.getAppSe
000018:   0cd0                            000c: move-result-object v0
00001a:   6ee0 fd1c 0000                  000d: invoke-virtual {v0}, Lcom/biznessapps/model/AppSettings;.is
000020:   0ad4                            0010: move-result v4
000022:   38d4 2f00                       0011: if-eqz v4, 0040 // +002f
000026:   54f4 5509                       0013: iget-object v4, v7, Lcom/biznessapps/activities/CommonFragm
00002a:   54f5 5609                       0015: iget-object v5, v7, Lcom/biznessapps/activities/CommonFragm
00002e:   6ee0 f40c 0700                  0017: invoke-virtual {v7}, Lcom/biznessapps/activities/CommonFrac
000034:   0cd6                            001a: move-result-object v6
000036:   6e30 9c19 5406                  001b: invoke-virtual {v4, v5, v6}, Lcom/biznessapps/fragments/uti
00003c:   54f4 5509                       001e: iget-object v4, v7, Lcom/biznessapps/activities/CommonFragm
000040:   6ee0 9a19 0400                  0020: invoke-virtual {v4}, Lcom/biznessapps/fragments/utils/Music
000046:   0cd4                            0023: move-result-object v4
000048:   6ee0 8b20 0400                  0024: invoke-virtual {v4}, Lcom/biznessapps/player/PlayerService*
00004e:   0cd2                            0027: move-result-object v2
000050:   38d2 1600                       0028: if-eqz v2, 003e // +0016
000054:   72d0 0b33 0200                  002a: invoke-interface {v2}, Ljava/util/List;.isEmpty:Z // method
00005a:   0ad4                            002d: move-result v4
00005c:   39d4 1000                       002e: if-nez v4, 003e // +0010
000060:   12d1                            0030: const/4 v1, #int 1 // #1
000062:   38d1 0700                       0031: if-eqz v1, 0038 // +0007
000066:   54f4 5609                       0033: iget-object v4, v7, Lcom/biznessapps/activities/CommonFragm
00006a:   6ee0 9409 3400                  0035: invoke-virtual {v4, v3}, Landroid/view/ViewGroup;.setVisibi
000070:   54f3 5909                       0038: iget-object v3, v7, Lcom/biznessapps/activities/CommonFragm
000074:   7110 6420 0300                  003a: invoke-static {v3}, Lcom/biznessapps/player/PlayerService;.
00007a:   0e00                            003d: return-void
00007c:   0131                            003e: move v1, v3
00007e:   28f2                            003f: goto 0031 // -000e
000080:   54f3 5609                       0040: iget-object v3, v7, Lcom/biznessapps/activities/CommonFragm
000084:   13d4 0800                       0042: const/16 v4, #int 8 // #8
000088:   6ee0 9409 4300                  0044: invoke-virtual {v3, v4}, Landroid/view/ViewGroup;.setVisibi
```

Fig. 8

```
const-string v0, "mN5" // string@007b
invoke-static {v0}, Lcom/nzhengDS;.DecryptString:Ljava/lang/String; // method@0031
move-result-object v0
invoke-static {v0}, Ljava/security/MessageDigest;.getInstance:Ljava/security/MessageDigest; // method@0062
move-result-object v0
invoke-virtual {v6}, Ljava/lang/String;.getBytes:[B // method@004e
move-result-object v1
invoke-virtual {v0, v1}, Ljava/security/MessageDigest;.update:V // method@0063
invoke-virtual {v0}, Ljava/security/MessageDigest;.digest:[B // method@0061
move-result-object v2
new-instance v3, Ljava/lang/StringBuffer; // type@0030
invoke-direct {v3}, Ljava/lang/StringBuffer;.<init>:V // method@0054
const/4 v0, #int 0 // #0
move v1, v0
array-length v0, v2
if-lt v1, v0, 0024 // +0007
invoke-virtual {v3}, Ljava/lang/StringBuffer;.toString:Ljava/lang/String; // method@0056
move-result-object v0
return-object v0
aget-byte v0, v2, v1
and-int/lit16 v0, v0, #int 255 // #00ff
invoke-static {v0}, Ljava/lang/Integer;.toHexString:Ljava/lang/String; // method@0049
move-result-object v0
invoke-virtual {v0}, Ljava/lang/String;.length:I // method@004f
move-result v4
const/4 v5, #int 2 // #2
if-lt v4, v5, 003a // +0009
invoke-virtual {v3, v0}, Ljava/lang/StringBuffer;.append:Ljava/lang/StringBuffer; // method@0055
add-int/lit8 v0, v1, #int 1 // #01
move v1, v0
goto 001c // -001d
new-instance v4, Ljava/lang/StringBuilder; // type@0031
const-string v5, "0" // string@000c
invoke-static {v5}, Lcom/nzhengDS;.DecryptString:Ljava/lang/String; // method@0031
move-result-object v5
invoke-direct {v4, v5}, Ljava/lang/StringBuilder;.<init>:V // method@0057
invoke-virtual {v4, v0}, Ljava/lang/StringBuilder;.append:Ljava/lang/StringBuilder; // method@0058
move-result-object v0
invoke-virtual {v0}, Ljava/lang/StringBuilder;.toString:Ljava/lang/String; // method@0059
```

METHOD AND DEVICE FOR DETECTING MALICIOUS CODE IN AN INTELLIGENT TERMINAL

FIELD OF THE INVENTION

The present invention relates to the technical field of intelligent terminal security, and more specifically relates to a method and device for detecting malicious code in an intelligent terminal.

BACKGROUND OF THE INVENTION

With the development of sciences and technologies, intelligent terminals are provided with more and more functions. For example, mobile phones have turned from conventional GSM and TDMA digital mobile phones into intelligent phones that have capabilities of processing multimedia resources and providing various kinds of information services such as network browsing, telephone conference, electronic commerce, etc., which, however, is also accompanied by increasing varieties of malicious code attacks to the mobile phones and increasingly serious personal data security issues. Intelligent mobile phone users suffer deeply from more and more mobile phone viruses.

SUMMARY OF THE INVENTION

In view of the problems above, a method and device for feature extraction according to the present invention are provided so as to overcome the above problems or at least partially solve the above problems.

According to one aspect of the present invention, there is provided a method for detecting malicious code in an intelligent terminal, comprising: acquiring a virtual machine executable file of an application from an application layer of an intelligent terminal operating system; decompiling the virtual machine executable file to obtain a decompiled function information structure; parsing the decompiled function information structure, and extracting a function calling sequence in the decompiled function information structure; matching the function calling sequence using a preset malicious code feature library; if matching succeeds, determining that the virtual machine executable file of the application contains malicious code.

Preferably, the method further comprises: by parsing the decompiled function information structure, obtaining a virtual machine mnemonic sequence; and extracting the function calling sequence from the virtual machine mnemonic sequence.

According to another aspect of the present invention, there is provided a device for detecting malicious code in an intelligent terminal, comprising: a file acquiring unit configured to acquire a virtual machine executable file of an application from an application layer of an intelligent terminal operating system; a decompiling unit configured to decompile the virtual machine executable file to obtain a decompiled function information structure; an extracting unit configured to parse the decompiled function information structure, and extract a function calling sequence in the decompiled function information structure; a detecting unit configured to match the function calling sequence using a preset malicious code feature library; and if matching succeeds, determine that the virtual machine executable file of the application contains malicious code.

It is seen that by analyzing the format of a dex file and de-compiling, the embodiments of the present invention obtain a function calling sequence; with the function calling sequence as a basic feature, matching is performed with malicious code feature library, thereby determining whether the dex file includes malicious code. Besides, function functionality can be analyzed and determined through the function calling sequence. Therefore, code of a series of function calling sequences may act as a target feature to match with the malicious code feature library, thereby determining whether the dex file contains malicious code.

By applying the solution of the present invention, whether the application contains malicious code may be analyzed and determined through the dex file of the application, such that a tampered application or malicious software may be detected and removed, thereby protecting security of the intelligent terminal.

In addition, according to another aspect of the present invention, there is provided a method of detecting malicious code in an intelligent code, comprising: acquiring a virtual machine executable file of an application from an application layer of an intelligent terminal operating system; decompiling the virtual machine executable file to obtain a decompiled function information structure; parsing the decompiled function information structure to obtain a virtual machine instruction sequence and a virtual machine mnemonic sequence corresponding to the virtual machine instruction sequence; analyzing and determining function functionality of the virtual machine mnemonic sequence, and determining a target feature according to the virtual machine instruction sequence corresponding to the virtual machine mnemonic sequence having the function functionality; matching the target feature using preset malicious code feature library, and if matching succeeds, determining that the virtual machine executable file of the application contains malicious code.

According to another aspect of the present invention, there is provided a device for detecting malicious code in an intelligent code, comprising: a file acquiring unit configured to acquire a virtual machine executable file of an application from an application layer of an intelligent terminal operating system; a decompiling unit configured to decompile the virtual machine executable file to obtain a decompiled function information structure; a parsing unit configured to parse the decompiled function information structure to obtain a virtual machine instruction sequence and a virtual machine mnemonic sequence corresponding to the virtual machine instruction sequence; a target feature determining unit configured to analyze and determine function functionality of the virtual machine mnemonic sequence, and determining a target feature according to the virtual machine instruction sequence corresponding to the virtual machine mnemonic sequence having the function functionality; a detecting unit for matching the target feature using preset malicious code feature library, and if matching succeeds, determine that the virtual machine executable file of the application contains malicious code.

It is seen that by analyzing the format of a dex file and de-compiling, the embodiments of the present invention may analyze and determine functionality of a function and may determine a function having certain functions as a target feature, and then match with the malicious code feature library, thereby determining whether the dex file contains malicious code.

By applying the solution of the present invention, the solution of the present application may analyze and determine whether the application contains malicious code such that a tampered application or malicious software may be detected and removed, thereby protecting security of the intelligent terminal.

The above are only summaries of the technical solutions of the present invention; in order to understand the technical means of the present invention more clearly, the implementation may be based on the content in the specification. Besides, in order to make the above and other objectives, features, and advantages of the present invention more apparent and comprehensible, preferred embodiments of the present invention will be specifically provided below.

BRIEF DESCRIPTION OF THE DRAWINGS

Through reading detailed depiction of the preferred embodiments below, various other advantages and benefits become clear to a person of normal skill in the art. The accompanying drawings are only used for the purpose of illustrating preferred embodiments, and should not be regarded as limitation to the present invention. Moreover, throughout the entire drawings, same reference numerals are used to indicate same components. In the accompanying drawings:

FIG. 7 illustrates a table of function information according to another embodiment;

FIG. 8 illustrates a function information structure obtained by decompiling a dex file according to another embodiment; and FIG. 9 illustrates code for performing a function calling sequence according to another embodiment.

DETAILED DESCRIPTION OF THE PREFERRED EMBODIMENTS

Figure 1:
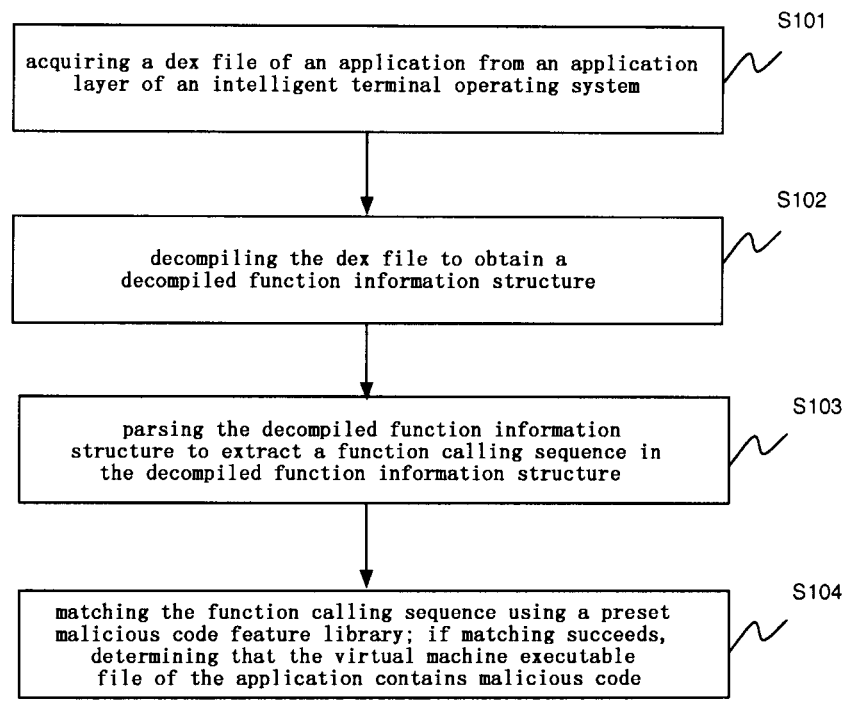
FIG. 1 illustrates a flow diagram of a method of detecting malicious code in an intelligent terminal according to a first embodiment of the present invention.

Hereinafter, exemplary embodiments of the present disclosure will be described in more detail with reference to the accompanying drawings. Although the accompanying drawings reveal the exemplary embodiments of the present disclosure, it should be understood that the present disclosure may be implemented in various forms and should not be limited by the embodiments illustrated here. On the contrary, these embodiments are provided for a more thorough understanding of the present disclosure and for a complete delivery of the scope of the present disclosure to those skilled in the art.

Android operating system, as an example, includes an application layer (app layer) and a system framework layer (framework layer); other layers possibly included through functional partition will not be discussed here. Wherein, the app layer may be generally understood as an upper layer, in charge of interfaces for interaction with a user, e.g., application maintenance, identifying different kinds of click contents upon clicking onto a page so as to display different context menus, and etc. The framework layer is generally used as an intermediate layer, mainly for forwarding a user request (e.g., starting an application, clicking on a link, click to save a picture, and the like) to a lower layer; and distributing contents completely processed by the lower layer to the upper layer either via a message or via an intermediate proxy class, so as to display them to the user.

Dalvik is a Java virtual machine for use in an Android platform. Dalvik, being optimized, allows for simultaneous running of examples of a plurality of virtual machines in a limited memory, and each Dalvik application is executed as an independent Linux process. The independent process may prevent all programs from being closed when the virtual machine fails. The Dalvik virtual machine may support running of a Java application that has been converted into a dex (Dalvik Executable) format. The dex format is a kind of compressed format specifically designed for Dalvik and suitable for a system with limited memory and processor speed.

It is seen that in the Android system, the dex file is a virtual machine executable file that may be directly loaded and executed in the Dalvik virtual machine (DalvikVM). Java source code may be converted into a dex file by ADT (Android Development Tools) through a complex compilation. The dex file is an optimized result for an embedded system. The Dalvik virtual machine does not employ standard Java virtual machine instruction code, but a set of instruction code unique to itself. Many classes of names and constant character strings are totally used in the dex file and make its volume smaller and the running efficiency higher.

During research, the Inventor of the present disclosure finds function functionality of a function in the dex file may be acquired by parsing the dex file. Therefore, it may be determined based thereupon whether the dex file contains malicious code (including scenarios that the dex file per se is malicious software, or the dex file is tampered, etc.).

Refer to FIG. 1, in which a flow diagram of a method of detecting malicious code in an intelligent terminal according to a first embodiment of the present invention.

The method for detecting malicious code in an intelligent terminal comprises steps below.

S101: acquiring a virtual machine executable file of an application from an application layer of an intelligent terminal operating system;

As previously mentioned, the Android operating system comprises an application layer (app layer) and a system framework layer (framework layer). The present invention focuses on study and improvement of the app layer. However, those skilled in the art understand that when the Android is started, Dalvik VM monitors all programs (APK files) and frameworks and build a dependency relationship tree for them. Through this dependency relationship tree, the Dalvik VM optimizes a code for each program and stores the optimized code into a Dalvik cache (dalvik-cache). In this way, all programs will use optimized code upon running. When a program (or framework) changes, the Dalvik VM will re-optimize the code and store them into the cache again. The cache/dalvik-cache is stored dex files generated by programs on the system, while data/dalvik-cache is stored dex files generated by data/app. In other words, the present invention focuses on analyzing and processing of dex files generated by data/app. However, it should be understood that the theory and operation of the present invention is likewise applicable to dex files generated by programs on the system.

The dex file may be obtained by parsing an APK (Android Package). The APK file is actually a compressed package of a zip format, but its affix name is modified to apk. The dex file may be obtained after decompressing the Unzip.

S102: decompiling the virtual machine executable file to obtain a decompiled function information structure;

The dex file is decompiled in a plurality of manners.

Manner 1: parsing the dex file according to a dex file format to obtain a function information structure of each class; determining a location and size of the dex file according to fields in the function information structure, to obtain a decompiled function information structure. Wherein, by parsing the function information structure, a bytecode array field indicating a function position of the dex file and a list length field indicating a function size of the dex file are obtained, thereby determining the position and size of the function of the dex file.

For example, the dex file is parsed according to a dex file format to obtain the function information body of each class. The function information structure includes fields as shown in the Table of FIG. 7.

Wherein, the insns_size and insns fields in each function information structure represent the function size and position, respectively. Then, the information structure of the function may be decompiled according to the fields insns_size and insns. The decompiled information structure is comprised of Dalvik VM bytes, which will be detailed later.

Manner 2: decompiling the dex file into a virtual machine byte code using a dex file decompilation tool.

As mentioned above, the Dalvik virtual machine runs a Dalvik bytecode, which exists in a dex executable file form. The Dalvik virtual machine executes codes by interpreting the dex file. Currently, some tools are provided to decompile a DEX file into Dalvik compilation code. such dex file decompiling tools include: baksmali, Dedexer 1.26, dexdump, dexinspecto 03-12-12r, IDA Pro, androguard, dex2jar, and 010 Editor, etc.

It is seen that all decompiled function information structures may be obtained by decompiling the dex file. Wherein, the function information structure comprises function execution code, which, in the present embodiment, is formed by a virtual machine instruction sequence and a virtual machine mnemonic sequence. As the example below, the function information structure is formed by an instruction sequence of Dalvik VM and a mnemonic sequence of the Dalvik VM.

For example, a function information structure obtained by decompiling the dex file according to one embodiment of the present invention is shown in FIG. 8.

It is seen that the dex file is decompiled into a Dalvik VM instruction sequence and a Dalvik VM mnemonic sequence.

S103: parsing the decompiled function information structure, to extract a function calling sequence in the decompiled function information structure;

As indicated in the example above, in the function information structures obtained by decompilation, the first two digits of each line in the machine code field denote an instruction sequence (the left circled part in the example above), while the part corresponding to the instruction sequence is a mnemonic symbol (right side of the example, partially circled, not completely selected). The mnemonic symbol is mainly for facilitating user communication and code compilation.

As indicated in the above example, decompiling the dex file may derive the instruction sequence of the function as "12 54 38 71 0c 6e 0c 6e 0a 38 54 54 6e 0c 6e 54 6e 0c 6e 0c 38 72 0a 39 12 38 54 6e 54 71 0e 01 28 54 13 6e." The mnemonic sequence is "const/4 iget-object if-eqz call-static move-result-object call-virtual move-result-object call-virtual move-result if-eqz iget-object iget-object call-virtual move-result-object call-virtual iget-object call-virtual move-result-object call-virtual move-result-object if-eqz call-interface move-result if-nez const/4 if-eqz iget-object call-virtual iget-object call-static return-void move goto iget-object const/16 call-virtual."

Next, a function calling sequence may be extracted from the mnemonic sequence. The function calling sequence refers to code with a semantic function, e.g., code with functions such as string decrypt, instance creating, as depicted later.

The framed portions in the example above are just relevant function calls.

By taking out and sorting these calls according to a call sequence, a function calling sequence may be formed. The function calling sequence substantially describes the behaviors of the present function.

Still take the example of FIG. 9:

1: "Lcom/mzhengDS;.DecryptString:Ljava/lang/String"

Through code analysis, it may be derived that the function decrypts a string.

2: "call-static {v0},Ljava/security/MessageDigest;.getInstance:Ljava/security/MessageDigest/"

Through code analysis, it is derived that the program creates a message signature instance. It may be guessed to encrypt the strings after 1 process interface using a hash algorithm like md5or sha.

3: "call-virtual {v6}, Ljava/lang/String;.getBytes:[B"

Getting a pointer of a string. It may be guessed that the string might be the string after decryption in process 1, while getting the pointer is possibly for encrypting the string using the instance of process 2.

4: "call-virtual {v0, v1}, Ljava/security/MessageDigest;.update:V"; "call-virtual (v0), Ljava/security/MessageDigest;.digest:[B"

The two function calls testify the above judgment. Based on the function name, it may be derived that this performs hash encrypt to the data.

It is seen from the example above that the function functionality may be substantially analyzed and determined through a function calling sequence.

S104: matching the function calling sequence using a preset malicious code feature library; if matching succeeds, then determining that the virtual machine executable file of the application contains malicious code.

The malicious code refers to a program or code that is propagated via a storage medium or a network, destroys integrity of an operating system and steals undisclosed confidential information in the system without authorization. With a mobile phone as an example, a mobile phone malicious code refers to malicious code against a portable device and a PDA. The mobile phone malicious code may be simply divided into a replication-type malicious code and a non-replication-type malicious code, wherein the replication-type malicious code mainly includes a virus and a worm, while the non-replication-type malicious code mainly includes a Trojan horse, rogue software, a malicious mobile code, a RootKit program, and etc.

A mobile phone malicious code protection technology performs protection against malicious code. There are many mobile phone malicious code protection technologies. For example, a feature value scanning manner. First, it needs to learn in advance to build a malicious code feature library; the feature values saved in the malicious code feature library may be a segment of continuous fixed strings, or several segments of definite strings inserted with other discontinuous strings having indefinite characters; during scanning, the to-be-detected file or the memory is detected based on the feature value or feature string in the feature library; when a matching item is found, it may be determined that the target is infected with malicious code. For another example, there is a virtual machine technology-based malicious code protection. This kind of protection scheme is mainly directed against polymorph viruses and metamorphic viruses. The virtual machine refers to a complete computer system simulated through software to have a complete hardware system function and run in a completely isolated environment. This scheme is also referred to as a software simulation method, where a software analyzer simulates and analyzes program running using a software method. It essentially simulates a small closed program execution environment in the memory, and all files to be subject to virus detection and killing are executed virtually therein. When removing a virus using a virtual machine technology, the feature value scanning technology is also used first, and only when the target is found to have the feature of an encrypted malicious code will the virtual machine module be activated to enable the encrypted code to decode on its own. After decoding, the traditional feature value scanning manner may be employed to detect and killing. For another example, there is a heuristic detection and killing manner. The heuristic detection and killing manner is mainly directed against constant mutation of malicious code for the purpose of enhancing the study on unknown malicious code. The so-called "heuristic" is originated from artificial intelligence, which refers to "a capability of self-discovery" or "a knowledge or technique that exerts a certain manner or method to judge an object." The heuristic detection and killing of the malicious code means the scanning software can detect a virus by analyzing a structure of the program and its behavior using a rule extracted empirically. Because usual behaviors of malicious code will have certain features such as reading and writing a file in an unconventional manner, terminating itself, or entering into a zero ring in an unconventional manner, so as to achieve the objectives of infection and damage. Therefore, whether a program is malicious code may be determined by scanning specific behaviors or a combination of multiple behaviors. Besides, similar samples clustering may be performed to a target program, e.g., clustering similar samples determined through analysis using a K-mean value clustering algorithm.

Irrespective of which protection manner is used, its core always includes two parts. The first part is reasonably organized a malicious code feature library; the second part is an efficient scanning algorithm (also referred to as a matching algorithm). The matching algorithm is generally divided into a single-mode matching algorithm and a multi-mode matching algorithm. The single-mode matching algorithm comprises a BF (Brute-Force) algorithm, a KMP (Knuth-Morris-Pratt) algorithm, a BM (Boyer-Moore) algorithm, and a QS (Quick Search) algorithm, etc. The multi-mode matching algorithm includes a typical multi-mode matching DFSA algorithm and an ordered binary tree-based multi-mode matching algorithm. Additionally, the matching algorithm may be divided into a fussy matching algorithm and a similar matching algorithm. With the BF algorithm as an example, it is a simple and intuitive single-mode matching algorithm, which belongs to a fussy matching algorithm.

Its basic idea is: first comparing a first character s1 in a main string with a first character t1 in the mode t. If they are identical, subsequent characters are continued to be compared one by one; otherwise, the second character s2 in s is compared with t1, so on and so forth, till each character in t is in turn equal to a consecutive character sequence in s (successful match); and returning the position of the first character of the character sequence in the main string; or a character sequence equal to t is not found in s (mismatch), returning 0. Further, with the KMP algorithm as an example, it is an improved mode matching algorithm; its biggest improvement over the BF algorithm is using the "partially matching" information implied in the mode, such that in the case of mismatch, the i pointer (pointing to a mismatch character) in the main string need not backtrack in the next comparison, while proceeding by "sliding" the j pointer (pointing to the position of next comparison) in the mode to a distance as far as possible. This sliding K is resolved by the next function. The KMP algorithm may be described as: suppose adding pointer i and pointer j by 1, respectively; if si is not equal to tj, i does not change, while j backs to the next (j) position for further comparison; so on and so forth, till a sub-string equal to the mode string is found in the main string, or a string equal to the mode string is not found after completely searching the whole main string; then the algorithm ends.

In this step, the function calling sequence is matched using the preset malicious code feature library; if matching succeeds, it is determined that the dex file of the application comprises malicious code. Specifically, there includes two scenarios. In the first scenario, the function calling sequence is used as a target for detection and killing, so as to perform detection and killing to the function calling sequence using the preset malicious code feature library. In the second scenario, functions having certain functionality formed by a plurality of function calling sequences are used as target features; with the preset malicious code feature library, detection and killing is performed to the target feature, e.g., performing function similarity matching or function feature fussy matching.

It should be noted that the present invention does not limit which malicious code protection solution is employed to detect malicious code. For example, the sample feature detection and killing (feature value scan), the virtual machine-based scan, or heuristic detection and killing as introduced above may be employed. In addition, a similar samples clustering may also be performed. Moreover, the present application makes no limitation to the matching algorithm. For example, the fussy matching algorithm or similarity matching algorithm as introduced above may be employed.

It is seen that by analyzing the format of a dex file and de-compiling, the first embodiment of the present invention obtain a function calling sequence; with the function calling sequence as a basic feature, matching with a malicious code feature library is performed, thereby determining whether the dex file includes malicious code. Besides, the function functionality can be analyzed and determined through the function calling sequence. Therefore, code of a series of function calling sequences may act as a target feature to match with the malicious code feature library, thereby determining whether the dex file contains malicious code.

By applying the solution of the present invention, whether the application contains malicious code may be analyzed and determined through the dex file of the application, such that a tampered application or malicious software may be detected and removed, thereby protecting security of the intelligent terminal.

Corresponding to the first embodiment method, an embodiment of the present invention further provides a device for detecting malicious code in an intelligent terminal. The device may be implemented by software, hardware or a combination of software and hardware. Specifically, the device may refer to a terminal device or a functional entity within the device. For example, the device may be a functional module within a mobile phone. Preferably, the device operates under android operating system.

Figure 2:
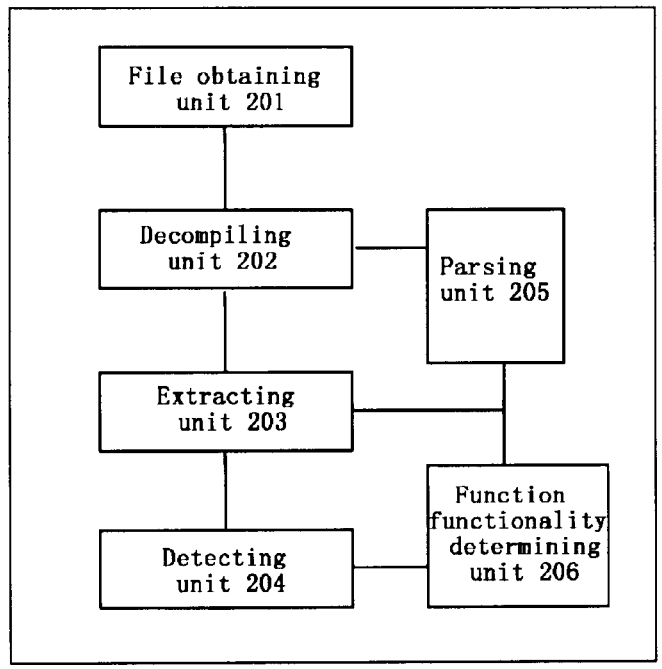
FIG. 2 illustrates a structural diagram of a device for detecting malicious code in an intelligent terminal according to a first embodiment of the present invention.

With reference to FIG. 2, the device comprises a file acquiring unit 201, a decompiling unit 202, an extracting unit 203, and a detecting unit 204.

Wherein:

the file acquiring unit 201 configured to acquire a virtual machine executable file of an application from an application layer of an intelligent terminal operating system;

a decompiling unit 202 configured to decompile the virtual machine executable file to obtain a decompiled function information structure;

an extracting unit 203 configured to extract a function calling sequence in the decompiled function information structure;

a detecting unit 204 configured to match the function calling sequence using preset malicious code feature library; if matching succeeds, determine that the virtual machine executable file of the application contains malicious code.

Preferably, the device further comprises a parsing unit 205:

The parsing unit 205 configured to obtain a virtual machine mnemonic sequence by parsing the decompiled function information structure;

In this case, the extracting unit 203 is configured to extract a function calling sequence from the virtual machine mnemonic sequence.

Preferably, there are multiple function calling sequences; in this case, the device further comprises:

a function functionality determining unit 206 configured to determine function functionality by analyzing instructions of a plurality of function calling sequences executed sequentially.

For example, the instructions of executing a plurality of function calling sequences in sequence determined by the function functionality determining unit 206 comprise: decrypting a string, creating a message signature instance, obtaining a string pointer, and hash encrypting.

Wherein, the detecting unit 204 is specifically configured to perform function similarity matching to the function calling sequence and/or perform function feature fussy matching to the function calling sequence using a preset malicious code feature library;

Or, the detecting unit 204 is configured to perform function similarity matching to a target feature and/or performing function feature fussy matching to the target feature using a preset malicious code feature library, wherein the target feature refers to a function having certain functionality and formed by a plurality of function calling sequences determined by the function functionality determining unit 206.

Besides, the detection unit 204 performs sample feature detection and killing, virtual-machine based detection and killing, heuristic detection and killing, and/or similar samples clustering to the dex file.

Wherein, the decompiling unit 202 is specifically configured to parse the dex file according to a dex file format to obtain a function information structure of each class; determine a position and size of the function of the dex file to obtain a decompiled function information structure; further, the decompiling unit 202 is configured to parse the function information structure to obtain a bytecode array field indicating the function size of the dex file; and determine the position and size of the function of the dex file according to the bytecode array field and the list length field;

Or, the decompiling unit 202 is specifically configured to decompile the dex file into a virtual machine bytecode using a dex file decompiling tool.

Wherein, the obtaining unit 201 is configured to find an installation package of an application from an application layer of the intelligent terminal operating system; and parse the installation package to obtain a dex file of the application.

Specific implementation details about the device may refer to the method embodiment, which will not be detailed here.

Figure 3:
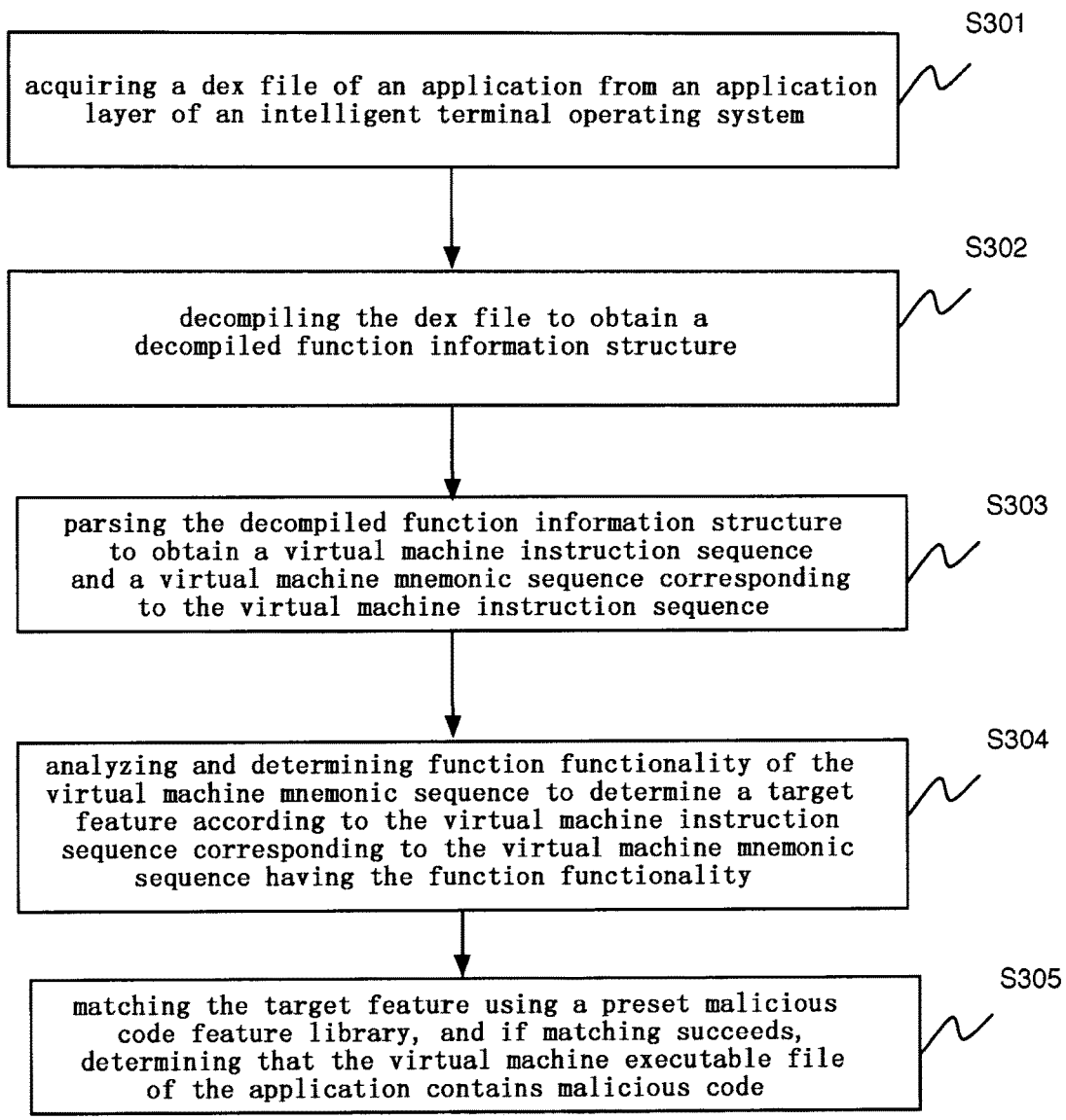
FIG. 3 illustrates a flow diagram of a method of detecting malicious code in an intelligent terminal according to a second embodiment of the present invention.

Refer to FIG. 3, in which a flow diagram of a method for detecting malicious code in an intelligent code is presented.

The method for detecting malicious code in an intelligent terminal comprises the following steps.

S301: acquiring a virtual machine executable file of an application from an application layer of an intelligent terminal operating system;

S302: decompiling the virtual machine executable file to obtain a decompiled function information structure;

Steps S301-S302 are similar steps to steps S101-S102 in the first embodiment, which will not be detailed here.

S303: parsing the decompiled function information structure to obtain a virtual machine instruction sequence and a virtual machine mnemonic sequence corresponding to the virtual machine instruction sequence;

For example, a function information structure obtained by decompiling the dex file according to one embodiment of the present invention is shown in FIG. 8.

It is seen that the dex file is decompiled into a Dalvik VM instruction sequence and a Dalvik VM mnemonic sequence.

As indicated in the example above, in the function information structures obtained by decompiling, the first two digits of each line in the machine code field denote an instruction sequence (the left circled part in the example above), while the part corresponding to the instruction sequence is a mnemonic symbol (right side of the example, partially circled, not completely selected). The mnemonic symbol is mainly for facilitating user communication and code compilation.

As indicated in the above example, decompiling the dex file may derive the instruction sequence of the function as "12 54 38 71 0c 6e 0c 6e 0a 38 54 54 6e 0c 6e 54 6e 0c 6e 0c 38 72 0a 39 12 38 54 6e 54 71 0e 01 28 54 13 6e." The mnemonic sequence is "const/4 iget-object if-eqz call-static move-result-object call-virtual move-result-object call-virtual move-result if-eqz iget-object iget-object call-virtual move-result-object call-virtual iget-object call-virtual move-result-object call-virtual move-result-object if-eqz call-interface move-result if-nez const/4 if-eqz iget-object call-virtual iget-object call-static return-void move goto iget-object const/16 call-virtual."

S304: analyzing and determining function functionality of the virtual machine mnemonic sequence, and determining a target feature according to the virtual machine instruction sequence corresponding to the virtual machine mnemonic sequence having the function functionality;

wherein the implementing manner of analyzing and determining function functionality of the virtual machine mnemonic sequence may comprise: extracting a function calling sequence from a virtual machine mnemonic sequence; determining function functionality of the virtual machine mnemonic sequence by analyzing instructions of a plurality of function calling sequences executed sequentially.

Still take the above example for discussion. Next, a function calling sequence may be extracted from the mnemonic sequence obtained from the previous step. The function calling sequence refers to code with a semantic function, e.g., code with functions such as string decrypting, instance creating, as depicted later.

The framed portions in the example above are just relevant function calls.

By taking out and sorting these calls according to a call sequence, a function calling sequence may be formed. The function calling sequence substantially describes the behaviors of the present function.

Still take the example of FIG. 9:

1: "Lcom/mzhengDS;.DecryptString:Ljava/lang/String"

Through code analysis, it may be derived that the function decrypts a string.

2: "call-static {v0},Ljava/security/MessageDigest;.getInstance:Ljava/security/MessageDi gest/"

Through code analysis, it is derived that the program creates a message signature instance. It may be guessed to encrypt the strings after 1 process interface using a hash algorithm like md5 sha.

3: "call-virtual {v6}, Ljava/lang/String;.getBytes:[B"

Getting a pointer of a string. It may be guessed that the string might be the string after decryption in process 1, while getting the pointer is possibly for encrypting the string using the instance of process 2.

4: "call-virtual {v0, v1}, Ljava/security/MessageDigest.update:V"; "call-virtual {v0}, Ljava/security/MessageDigest;.digest:[B"

The two function calls testify the above judgment. Based on the function name, it may be derived that this performs hash cipher to the data.

It is seen from the example above that the function functionality may be substantially analyzed and determined through a function calling sequence.

Then, the instruction sequence corresponding to the mnemonic sequence where the function calling sequence is located represents a feature of a function with certain functionality. For example, the instruction sequence "12 54 38 71 0c 6e 0c 6e 0a 38 54 54 6e 0c 6e 54 6e 0c 6e 0c 38 72 0a 39 12 38 54 6e 54 71 0e 01 28 54 13 6e" represents a feature of a function with certain functionality. When performing malicious code detection, a target feature may be determined for detection based thereupon. For example, an instruction sequence with the above function functionality may be used as a target feature, or a subset (a portion of instruction sequences) of instruction sequences with the function functionality above is used as the target feature.

S305: matching the target feature using a preset malicious code feature library, and if matching succeeds, then determining that the virtual machine executable file of the application contains malicious code.

Step S305 is similar to S104 in the first embodiment, which will not be detailed here.

It is seen that by analyzing the format of a dex file and de-compiling, the second embodiment of the present invention may analyze and determine functionality of a function and may determine a function having certain functions as a target feature, and then match with the malicious code feature library, thereby determining whether the dex file contains malicious code.

By applying the solution of the present invention, the solution of the present application may analyze and determine whether the application contains malicious code such that a tampered application or malicious software may be detected and removed, thereby protecting security of the intelligent terminal.

Corresponding to the second embodiment method above, the embodiments of the present invention also provide a device for detecting malicious code in an intelligent terminal. The device may be implemented by software, hardware or a combination of software and hardware. Specifically, the device may refer to a terminal device or a functional entity within the device. For example, the device may be a functional module within a mobile phone. Preferably, the device operates under an Android operating system.

Figure 4:
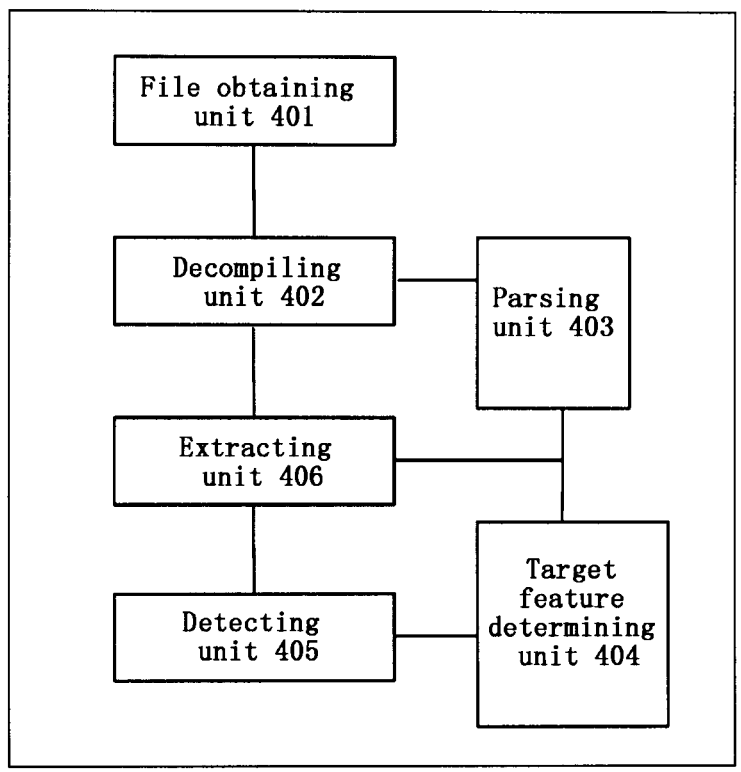
FIG. 4 illustrates a structural diagram of a device for detecting malicious code in an intelligent terminal according to a second embodiment of the present invention.

With reference to FIG. 4, the device comprises a file acquiring unit 401, a decompiling unit 402, a parsing unit 403, a target feature determining unit 404, and a detecting unit 405.

Wherein:

the file acquiring unit 401 is configured to acquire a virtual machine executable file of an application from an application layer of an intelligent terminal operating system;

the decompiling unit 402 configured to decompile the virtual machine executable file to obtain a decompiled function information structure;

the parsing unit 403 configured to parse the decompiled function information structure to obtain a virtual machine instruction sequence and a virtual machine mnemonic sequence corresponding to the virtual machine instruction sequence;

the target feature determining unit 404 configured to analyze and determining function functionality of the virtual machine mnemonic sequence, and determine a target feature according to the virtual machine instruction sequence corresponding to the virtual machine mnemonic sequence having the function functionality; and the detecting unit 405 configured to match the target feature using a preset malicious code feature library, and if matching succeeds, determine that the virtual machine executable file of the application contains malicious code.

Preferably, the device further comprises an extracting unit 406:

The extracting unit 406 configured to extract a function calling sequence from the virtual machine mnemonic sequence;

In this case, the target feature determining unit 404 specifically configured to determine function functionality of the virtual machine mnemonic sequence by analyzing instructions of a plurality of function calling sequences executed sequentially.

In this case, the target feature determining unit 404 specifically configured to use the virtual machine instruction sequence corresponding to the virtual machine mnemonic sequence having the function functionality as the target feature, or use a subset of virtual machine instruction sequence corresponding to the virtual machine mnemonic sequence having the function functionality as the target feature. The instructions of executing a plurality of function calling sequences in sequence determined by the target feature determining unit 404 comprise: decrypting a string, creating a message signature instance, obtaining a string pointer, and hash encrypting.

Wherein, the detecting unit 405 specifically configured to perform function similarity matching to the target feature and/or perform function feature fussy matching to the target feature using a preset malicious code feature library.

Moreover, the detecting unit 405 performs sample feature detection and killing, virtual-machine based detection and killing, heuristic detection and killing, and/or similar samples clustering to the dex file.

Wherein, the decompiling unit 402 specifically configured to parse the dex file according to a dex file format to obtain a function information structure of each class; determine a position and size of the function of the dex file to obtain a decompiled function information structure; further, the decompiling unit 402 configured to parse the function information structure to obtain a bytecode array field indicating the function size of the dex file; and determine the position and size of the function of the dex file according to the bytecode array field and the list length field;

Or, the decompiling unit 402 specifically configured to decompile the dex file into a virtual machine bytecode using a virtual machine executable decompiling tool.

Wherein, the obtaining unit 401 specifically configured to find an installation package of an application from an application layer of the intelligent terminal operating system; and parsing the installation package to obtain a dex file of the application.

Specific implementation details about the device may refer to the method embodiment, which will not be detailed here.

The algorithm and display provided here are not inherently related to any specific computer, virtual system or other device. Various general systems may also be used with the teaching based on that. According to the depiction above, a structure required for building such system is obvious. In addition, the present invention is not directed to any specific programming language. It should be understood that various programming languages may be utilized to implement the content of the present invention depicted here, and the depiction above with respect to the specific language is for disclosing the preferred embodiments of the present invention.

The specification provided here illustrates many specific details. However, it should be understood that the embodiments of the present invention may be implemented without these specific details. In some embodiments, known methods, structures and technologies are not illustrated in detail so as not to blur the understanding of the present invention.

Similarly, it should be understood that in order to simplify the present disclosure and facilitate understanding one or more of various invention aspects, in the depiction of the exemplary embodiments of the present invention above, respective features of the present invention are sometimes grouped into a single embodiment, a figure or a depiction of the figure. However, the method of the present disclosure should not be interpreted as reflecting the following intentions: the present invention as claimed claims more features than the explicitly stated features in each claim. More specifically, as reflected by the claims below, the invention aspect is less than all features in a single embodiment as disclosed above. Therefore, the claims conforming to a specific embodiment are thereby explicitly incorporated in the specific embodiment, wherein each claim per se is used as a standalone embodiment of the present invention.

Those skilled in the art may understand that modules in a device in an embodiment may be adapted and provided in one or more devices different from the embodiment. Modules or units or components in an embodiment may be combined into one module or unit or assembly; besides, they may also be divided into a plurality of sub-modules or sub-units or sub-assemblies. Except that at least some of such features and/or processes or units are mutually exclusive, any combination may be employed to combine all features disclosed in the specification (including the appended claims, abstract and drawings) and all processes or units of any method or device such disclosed. Except otherwise explicitly stated, each feature disclosed in the present specification (including the appended claims, abstract, and drawings) may be replaced by alternative features providing same, equivalent or similar objectives.

Besides, those skilled in the art can understand that although some embodiments depicted here include some features, rather than other features, included in other embodiments, a combination of features from different embodiments means being within the scope of the present invention but forming a different embodiment. For example, in the appended claims, any one of the embodiments as claimed here may be used in any combination manner.

Various component embodiments of the present invention may be implemented by hardware or by software modules running on one or more processors, or implemented by their combination. Those skilled in the art should understand that in practice, a microprocessor or a digital signal processor (DSP) may be used to implement some or all functions of some or all components of the device for feature extraction according to the embodiments of the present invention. The present invention may also be implemented a device or apparatus program (e.g., a computer program and a computer program product) for implementing a part or all of the method described here. Such a problem for implementing the present invention may be stored on a computer readable medium, or may have a form of one or more signals. Such signals may be downloaded from an Internet website, or provided on a carrier signal, or provided in any other form.

Figure 5:
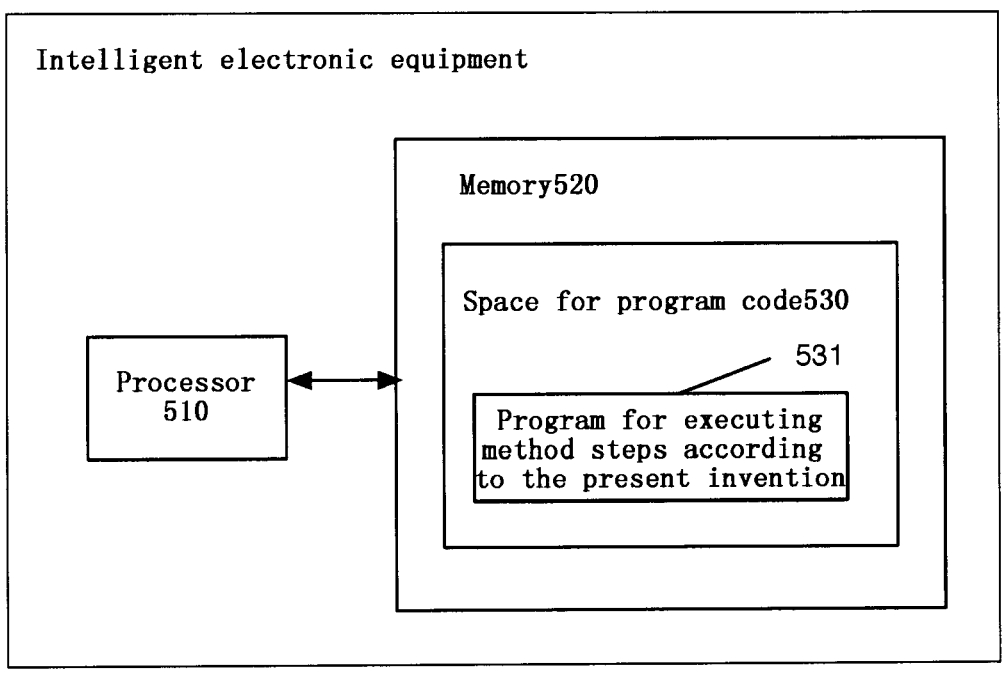
FIG. 5 illustrates a block diagram of an intelligent electronic apparatus for performing the method according to the present invention.
Figure 6:
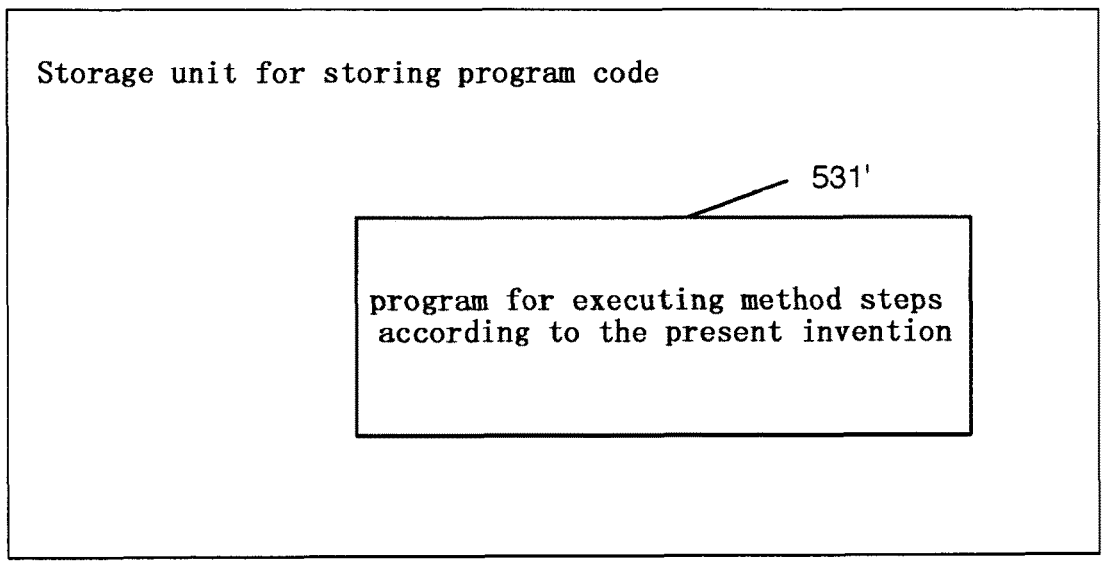
FIG. 6 illustrates a schematic diagram of a storage unit for maintaining or carrying programs implementing the method of the present invention.

For example, FIG. 5 illustrates an intelligent electronic apparatus that may implement the method for detecting malicious code in an intelligent terminal according to the present invention. The intelligent device traditionally comprises a processor 510 and a computer program product or a computer readable medium in a form of memory 520. The memory 520 may be an electronic storage such as a flash memory, an EEPROM (Electrically Erasable Programmable Read-Only Memory), an EPROM, a hard disk or a ROM. The memory 520 has a storage space 530 with program code 531 for executing any method steps in the method. For example, the storage space 530 for program code may include various program codes 531 for implementing respective steps in the method above, respectively. These program codes may be read out from one or more computer program code or written into one or more such computer program code. These computer program products include program code carriers such as a hard disk, a compact disk (CD), a memory card or a floppy disk and the like. Such computer program product is generally a portable or fixed storage unit as depicted with reference to FIG. 6. The storage unit may have a storage segment, a storage space and the like, in a similar arrangement to the memory 520 in the intelligence electronic apparatus of FIG. 6. The program code may, for example, be compressed in any appropriate form. Generally, the storage unit includes a computer readable code 531', i.e., code that may be read by a processor such as the processor 510. These codes, when being executed by the server, cause the server to execute various steps of the method depicted above.

It should be noted that the embodiments above are intended to illustrate the present invention, not intended to limit the present invention; moreover, without departing from the scope of the appended claims, those skilled in the art may design an alternative embodiments. In the claims, no reference numerals included within parentheses should constitute a limitation to the claims. The word "comprise" does not exclude elements or steps not stated in the claims. Wording like "a" or "an" before an element does not exclude existence of a plurality of such elements. The present invention may be implemented by virtue of hardware including a plurality of different elements and an appropriately programmed computer. In a device claim listing several means, several of such means may be embodied through the same hardware item. Use of words like first, second, and third and etc. does not indicate any sequence. These words may be explained as names.

The invention claimed is:

1. A method for detecting malicious code in an intelligent terminal, comprising:
    acquiring a virtual machine executable file of an application from an application layer of an intelligent terminal operating system;
    decompiling the virtual machine executable file to obtain a decompiled function information structure;
    parsing the decompiled function information structure to obtain a virtual machine mnemonic sequence, and extracting a function calling sequence from the virtual machine mnemonic sequence so as to obtain the function calling sequence in the decompiled function information structure; and
    utilizing a preset malicious code feature library to match the function calling sequence, and if matching succeeds, determining that the virtual machine executable file of the application contains malicious code.

2. The method according to claim 1, wherein there are multiple function calling sequences; the method further comprises:
    determining functionality of the function calling sequence by analyzing an instruction of sequentially executing multiple function calling sequences.

3. The method according to claim 2, wherein the instruction of sequentially executing multiple function calling sequences comprises:
    decrypting a string, creating a message signature instance, obtaining a string pointer, and hash encrypting.

4. The method according to claim 2, wherein taking a function having certain functionality and formed by the plurality of function calling sequences as a target feature;
    the utilizing a preset malicious code feature library to match the function calling sequence comprises:
    using the preset malicious code feature library to perform function similarity matching to the target feature and/or perform function feature fussy matching to the target feature.

5. The method according to claim 1, wherein the parsing the decompiled function information structure to obtain a virtual machine mnemonic sequence, comprising:
    analyzing and determining function functionality of the virtual machine mnemonic sequence, and determining a function calling sequence according to the virtual machine instruction sequence corresponding to the virtual machine mnemonic sequence having the function functionality.

6. A device for detecting malicious code in an intelligent terminal, comprising a memory storing computer executable instructions thereon and at least one processor to execute the instructions to cause:
    acquiring a virtual machine executable file of an application from an application layer of an intelligent terminal operating system;
    decompiling the virtual machine executable file to obtain a decompiled function information structure;
    parsing the decompiled function information structure to obtain a virtual machine mnemonic sequence and extracting a function calling sequence from the virtual machine mnemonic sequence so as to obtain the function calling, sequence in the decompiled function information structure; and
    matching the function calling sequence using a preset malicious code feature library; if matching succeeds, determining that the virtual machine executable file of the application contains malicious code.

7. The device according to claim 6, wherein there are multiple function calling sequences; the processor further executes the instructions to cause:
    determining function functionality by analyzing an instruction of sequentially executing multiple function calling sequences.

8. The device according to claim 7, wherein the instruction of sequentially executing multiple function calling sequences comprises:
    decrypting a string, creating a message signature instance, obtaining a string pointer, and hash encrypting.

9. The device according to claim 7, wherein the matching the function calling sequence using a preset malicious code feature library comprises:
    performing function similarity matching to a target feature and/or performing function feature fussy matching to the target feature using the preset malicious code feature library, wherein the target feature refers to a function having certain functionality and formed by the plurality of function calling sequences.

* * * * *